D. H. GABRIEL.
PROTECTOR FOR TIRES.
APPLICATION FILED MAR. 12, 1910.
1,014,458.
Patented Jan. 9, 1912.
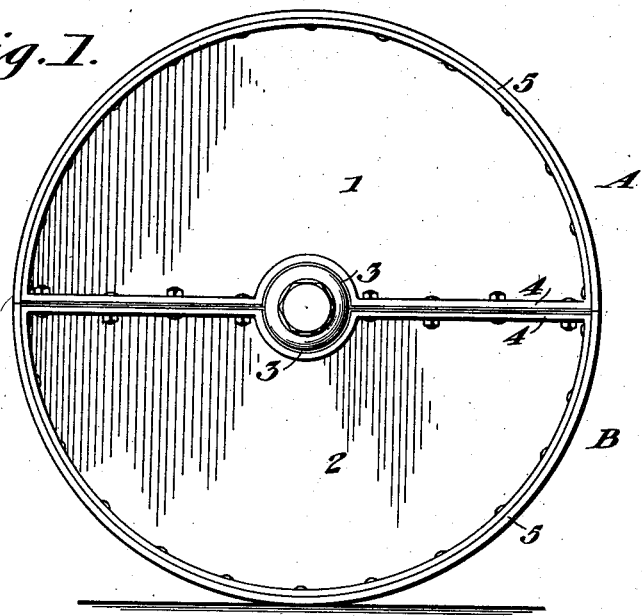
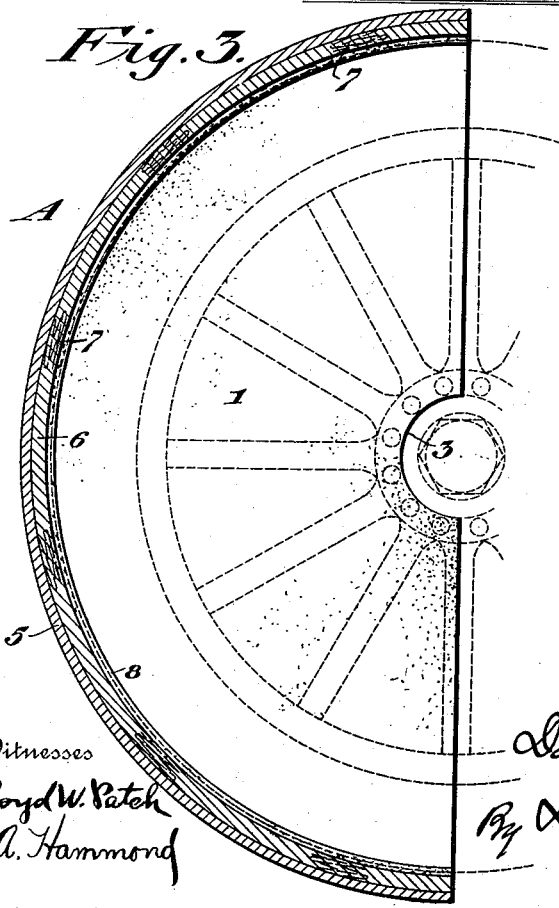
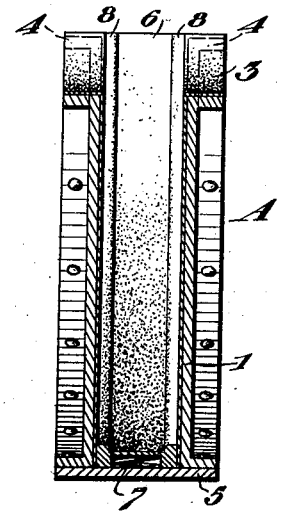

UNITED STATES PATENT OFFICE.

DARNEVILLE HYACINTHE GABRIEL, OF ADELINE, LOUISIANA.

PROTECTOR FOR TIRES.

1,014,458. Specification of Letters Patent. Patented Jan. 9, 1912.

Application filed March 12, 1910. Serial No. 548,884.

*To all whom it may concern:*

Be it known that I, DARNEVILLE H. GABRIEL, a citizen of the United States, residing at Adeline, in the parish of St. Mary and State of Louisiana, have invented certain new and useful Improvements in Protectors for Tires, of which the following is a specification.

My invention relates to an improvement in protectors for tires of vehicles.

The object is to provide means whereby the invention can be applied to either an automobile wheel or wagon wheel.

A further object is the provision of resilient means which forms a cushion for the wheel, and gives the effect of a spring wheel.

The invention consists in certain other novel features of construction and combinations of parts which will be hereinafter described and pointed out in the claim.

In the accompanying drawings:—Figure 1 is a view in elevation, showing the invention applied to a wheel, Fig. 2 is a sectional view through one of the sections, and Fig. 3 is a longitudinal sectional view of one of the sections.

A, and B, represent the two sections of the wheel which consist of side members 1 and 2. Each side member 1 and 2 of each section is provided with a semi-circular opening 3 which is adapted to fit upon the hub of the vehicle, so that when the two sections A and B are brought together, the side members will fit upon the hub, and the flanges 4 of the side members will be connected together, and whereby the two sections are securely fastened. Each section includes and is partially formed by a flat tire 5. A strip 6 preferably of rubber, is received between the side members of each section, and is adapted to fit or be received against the tire 5. The strips 6 are provided with recesses 7, in which coiled springs bearing between the tires 5 and the strips 6 are received. Upon the inner surface of the strips are ridges 8, 8, between which is received the tire of the vehicle wheel to prevent any lateral movement of the wheel within the protector, and to insure proper engagement between the strips and the tire of the vehicle. The spring between the strips 6 and the tires 5 will act as a cushion for the vehicle wheel; and especially in the use of wagon wheels, it will take up a great deal of the jar transmitted to the wheel when the vehicle passes over obstructions.

From the foregoing, it will be seen that I have provided a very simple means for protecting the wheels of both wagons and automobiles, whereby tires will be saved in the use of automobiles, and which will prevent the tires of the automobile from being punctured.

Having fully described my invention, what I claim as new and desire to secure by Letters Patent, is:—

A protector for vehicle wheels, comprising two sections adapted to receive a vehicle wheel, said sections having flanges along the edges thereof, means for connecting the flanges of the two sections together, rubber strips received in the sections and connected to the periphery thereof having recesses therein, cushioning means received in the recesses, and ridges on the strips adapted to engage each side of the vehicle wheel tire.

In testimony whereof I affix my signature, in the presence of two witnesses.

DARNEVILLE HYACINTHE GABRIEL.

Witnesses:
 HENRY DAIGLE,
 HERBERT ROMAIR.

---

Copies of this patent may be obtained for five cents each, by addressing the "Commissioner of Patents, Washington, D. C."